Jan. 26, 1960
F. W. BRAENDEL
2,922,455
SELF TAPPING INSERT FOR INTERCHANGEABLE
USE IN THROUGH GRAIN OR CROSS
GRAIN WOODEN STRUCTURES
Filed Nov. 23, 1956
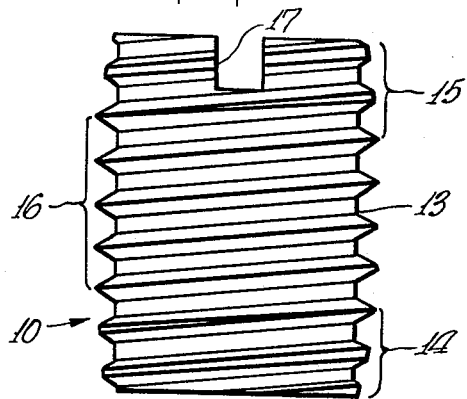
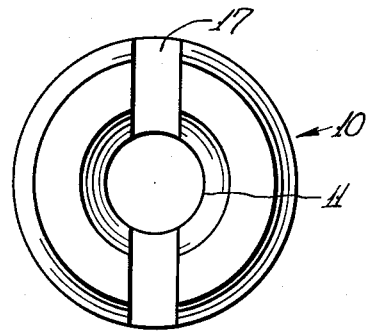
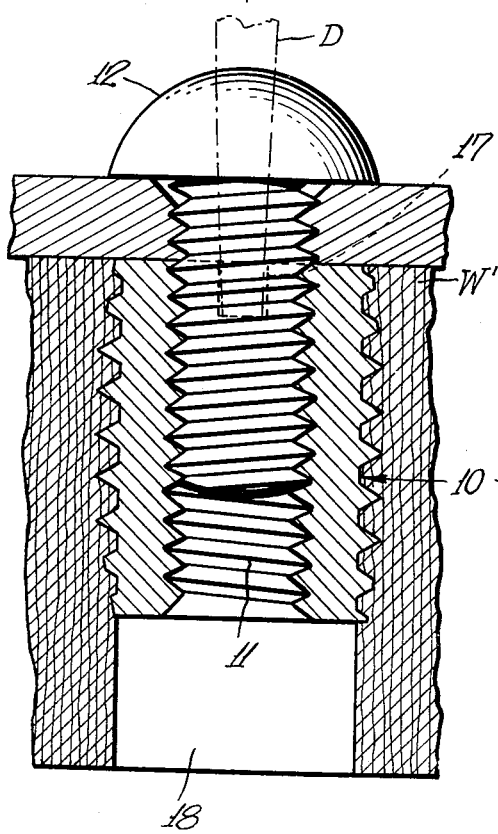
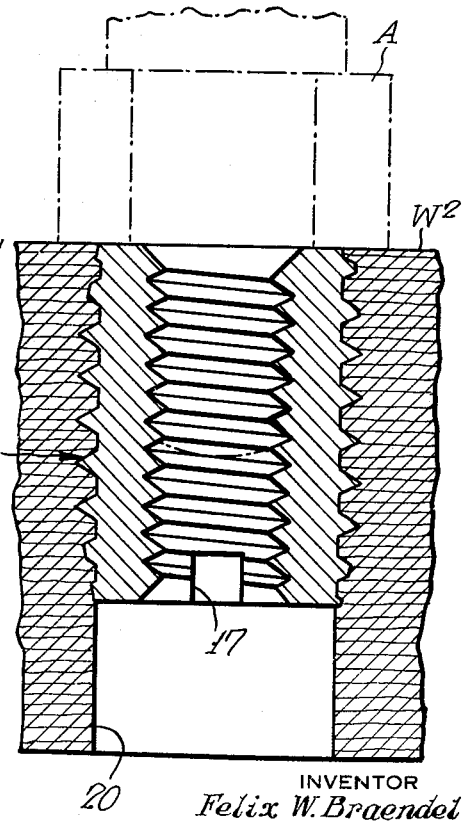
INVENTOR
*Felix W. Braendel*
BY
*Dean Fairbank & Hirsch*
ATTORNEYS

United States Patent Office 2,922,455
Patented Jan. 26, 1960

2,922,455

SELF TAPPING INSERT FOR INTERCHANGEABLE USE IN THROUGH GRAIN OR CROSS GRAIN WOODEN STRUCTURES

Felix W. Braendel, Teaneck, N.J., assignor to Groov-Pin Corporation, a corporation of New York Application November 23, 1956, Serial No. 624,150

1 Claim. (Cl. 151—41.7)

The present invention is concerned with a metal insert designed securely to retain a metal screw in a structure of relatively soft material.

The present invention is particularly concerned with an insert adapted for application to wood structures, whether of soft or hard wood, that are pre-bored to accommodate the insert, either across the grain or along the grain of the wood, and which is likewise applicable to various plastic including soft plastic structures.

It is among the objects of the invention to provide a simple screw insert which may be readily screwed into a wood structure having a bore than extends across the grain or alternatively one that extends along the grain; which admits of combined self-tapping and pressing of the thread conformation according to the external thread of the insert for cross grain application, and which is devoid of tapping action in application in a bore lengthwise of the grain, and thus avoids the splitting of the wood that might occur were a tapping operation resorted to in said application lengthwise of the grain; which in both applications affords a secure hold in the wood, so that the insert is unlikely to back out in removal of the tool by which the insert is applied, and which insert is applicable for like secure retention also in plastic structures of various types including relatively soft ones.

Another object is to provide a screw thread-forming insert of the above type which may be readily fabricated at low cost on automatic screw machines.

In the accompanying drawings in which is shown one of various possible embodiments of the several features of the invention, Fig. 1 is a side elevation partly in section, showing one embodiment of the insert, Fig. 2 is an end elevation thereof, Fig. 3 is a cross sectional view showing the insert installed in a bore extending along the grain, and Fig. 4 is a view similar to Fig. 3, showing the installation of the insert in a bore crosswise of the grain.

Referring now to the drawings, the insert which is usually of brass but may be of steel or other metal if desired, consists of a metal tube 10 having an internal screw thread 11 for accommodating the usual fastening screw 12 which would not reliably hold directly in the wood structure, and having an external screw thread 13, preferably also extending the entire length thereof.

The insert is externally chamfered at 14 and 15 at the respective ends thereof, each chamfer being desirably of one or more convolutions of thread, the convolutions intervening between the chamfers at the two ends being unchamfered as at 16.

At one end, the insert desirably has a screw driver slot 17 thereacross, of depth that ends short of the chamfer 15. More particularly the screw driver slot may be of depth to extend approximately two thirds the length of the chamfered external thread 15, or for approximately one and one-third convolutions where the chamfer is two convolutions. For application of the insert in a wood structure W' which has been cylindrically bored as at 18 longitudinally of the grain, the screw driver slot 17 is disposed outermost and the insert is screwed into the bore 18 by resort to a screw driver D or other suitable insert applicator (shown in dot and dash lines) until the insert comes flush with the face of the wood, as shown in Fig. 3.

It will be seen that in this application the entering pilot or chamfer 14 centers the insert and progressively presses a thread conformation into the wood structure, which threaded conformation is completed by the unchamfered outer threads 16 beyond chamfer 14 that press the threads into the wood structure W'. In this mode of application, there is no cutting of the grain as in a self tapping insert, and thus there is no tendency to split the wood when the grain runs lengthwise of the insert. The fastening is here effected entirely by the frictional hold resulting from the pressing of the metal insrt into the wall of the cylindrical bore 18 in the wood to produce a threaded conformation that is a substantially exact complement of the metal thread 13.

The chamfer 15 at the external end of the insert precludes a possible breaking or splitting at this region. For the wood tends to conform to the chamfer at the outer end of the insert, due to the displacement of wood incurred in forming the depressed thread therein. In the absence of such chamfer 14, splitting of the wood is likely to occur in installing the insert.

For application of the insert in cross grain wood and particularly in hard cross grain wood, the insert is preferably introduced with the screw driver slot end 17 first, and the introduction is effected by a suitable insert applicator such as illustrated at A in dot and dash lines, upon which the insert is screwed. In this mode of application, the screw driver slot 17, which may be of width in the order of one quarter the external thread diameter of the insert, acts as a tap to cut the hard wood near the outer end portion of the chamfer 15, but the inner portion of the chamfer 15 beyond the slot 17, performs no cutting action, but rather serves to depress the initially cut thread further inward, so that the full depth of the outer thread 13 becomes securely accommodated in the wood structure. The tapping is desirable, especially with hard wood, when the insert is introduced into a bore 20 that extends cross-grain, so as to avoid the danger of fracture in attempting here to press the full depth of thread 13 into the wall of bore 20.

In either application shown in Figs. 3 and 4, and in application to plastic structures, the insert is retained with adequate security and will not back out in removal of the tool A used for installing the insert, or in removal of a screw 12 retained in the insert.

Desirably the insert is applied in the manner shown in Fig. 3, into a cylindrical bore in soft plastic structures, and in the manner of Fig. 4, to harder plastic structures.

By way of summary, the insert is thus of high utility for installation in a bore along the grain of the wood, the screw driver slot serving for application of a tool for such installation, the chamfer at the innermost end of the insert here serving as a pilot, while the chamfer at the screw driver slot end relieves the outer part of the bore from splitting strain and affords a gap for spread of wood pressed out in depression of thread tracks into the wood by the external thread on the insert. The identical insert is also applicable into a cylindrical bore that extends cross-grain. In hard wood more particularly, the screw driver slot end is innermost and acts as a tap to facilitate the depression of the remainder of the outer thread height of the insert into the wood. The versatility of the insert for the two wood applications, as well as for softer and harder plastic, renders the product particularly useful.

As many changes could be made in the above insert and many apparently widely different embodiments of this invention could be made without departing from the scope of the claim, it is intended that all matter contained in the above description, or shown in the accompanying drawings, shall be interpreted as illustrative and not in a limiting sense.

Having thus described my invention what I claim as new and desire to secure by Letters Patent of the United States is:

A screw-retaining metal insert suitable for installation in a corresponding bore extending alternatively along or across the grain of a wood structure, said insert comprising a metal tube having an external and an internal thread, each of uniform diameter extending substantially the entire length of the tube, said tube having a screw driver slot across one of its ends, the screw driver slot intersecting at least one turn of the external thread, its length extending substantially longitudinally of the insert for cutting effect, said external thread being flattened off at each end of the insert.

References Cited in the file of this patent

UNITED STATES PATENTS

| | | |
|---|---|---|
| 2,295,314 | Whitney | Sept. 8, 1942 |
| 2,400,348 | Greene | May 14, 1946 |
| 2,742,074 | Rosan | Apr. 17, 1956 |

FOREIGN PATENTS

| | | |
|---|---|---|
| 668,818 | Great Britain | Mar. 19, 1952 |